United States Patent
Nakamura et al.

(10) Patent No.: US 9,115,681 B2
(45) Date of Patent: Aug. 25, 2015

(54) PROTECTION DEVICE OF ENGINE STARTING DEVICE

(75) Inventors: Koin Nakamura, Isehara (JP); Satoru Okuma, Machida (JP); Fumihiko Imamura, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 7 days.

(21) Appl. No.: 13/985,678

(22) PCT Filed: Jan. 25, 2012

(86) PCT No.: PCT/JP2012/051521
§ 371 (c)(1),
(2), (4) Date: Sep. 5, 2013

(87) PCT Pub. No.: WO2012/111396
PCT Pub. Date: Aug. 23, 2012

(65) Prior Publication Data
US 2014/0026689 A1    Jan. 30, 2014

(30) Foreign Application Priority Data
Feb. 16, 2011    (JP) ................. P2011-030466

(51) Int. Cl.
| | |
|---|---|
| *F02D 29/06* | (2006.01) |
| *H02P 9/04* | (2006.01) |
| *F02N 11/00* | (2006.01) |
| *F02D 29/02* | (2006.01) |
| *F02N 11/08* | (2006.01) |
| *B60L 9/00* | (2006.01) |
| *G05D 1/00* | (2006.01) |
| *F02N 15/02* | (2006.01) |

(52) U.S. Cl.
CPC ............. *F02N 11/00* (2013.01); *F02D 29/02* (2013.01); *F02N 11/006* (2013.01); *F02N 11/0814* (2013.01); *F02N 11/0862* (2013.01); *F02N 15/022* (2013.01); *F02N 2011/0881* (2013.01); *F02N 2300/2002* (2013.01); *Y02T 10/48* (2013.01); *Y10T 74/13* (2015.01)

(58) Field of Classification Search
USPC ............................................ 290/40 C; 701/22
See application file for complete search history.

(56) References Cited

U.S. PATENT DOCUMENTS

| | | | |
|---|---|---|---|
| 6,335,574 B1 | 1/2002 | Ochiai et al. ............... | 290/40 C |
| 6,396,165 B1 | 5/2002 | Nagano et al. .............. | 307/10.6 |
| 2009/0125172 A1* | 5/2009 | Matsubara ................... | 701/22 |
| 2013/0124027 A1* | 5/2013 | Tanishima et al. .......... | 701/22 |
| 2013/0151412 A1* | 6/2013 | Spahl et al. ................. | 705/44 |
| 2013/0158761 A1* | 6/2013 | Kawakami et al. .......... | 701/22 |

(Continued)

FOREIGN PATENT DOCUMENTS

| | | |
|---|---|---|
| JP | 05-270294 A | 10/1993 |
| JP | 2000-161102 A | 6/2000 |

(Continued)

*Primary Examiner* — Pedro J Cuevas
(74) *Attorney, Agent, or Firm* — Foley & Lardner LLP

(57) ABSTRACT

Disclosed is a protection device of an engine starting device that protects the engine starting device provided with a plurality of starting devices including a starter capable of starting an engine and a motor/generator capable of starting the engine, the engine being started by driving the motor/generator under a first condition, the engine being started by driving the starter under a second condition less generated than the first condition, wherein the starter is forcedly driven on a regular basis.

8 Claims, 20 Drawing Sheets

(56) References Cited

U.S. PATENT DOCUMENTS

| | | | |
|---|---|---|---|
| 2013/0173099 A1* | 7/2013 | Takagi | 701/22 |
| 2013/0173100 A1* | 7/2013 | Takagi | 701/22 |
| 2013/0231815 A1* | 9/2013 | Tanishima et al. | 701/22 |
| 2014/0012449 A1* | 1/2014 | Arita | 701/22 |
| 2014/0081563 A1* | 3/2014 | Wang et al. | 701/113 |
| 2014/0148986 A1* | 5/2014 | Yoshikawa et al. | 701/22 |
| 2014/0200763 A1* | 7/2014 | Sisk | 701/36 |
| 2014/0244089 A1* | 8/2014 | Hattori | 701/22 |
| 2014/0249730 A1* | 9/2014 | Hilberer | 701/70 |

FOREIGN PATENT DOCUMENTS

| | | |
|---|---|---|
| JP | 2001-065437 A | 3/2001 |
| JP | 2003-247478 A | 9/2003 |
| JP | 2005-069071 A | 3/2005 |

\* cited by examiner

PROTECTION DEVICE OF ENGINE STARTING DEVICE

TECHNICAL FIELD

The present invention relates to a protection device of an engine starting device provided with a plurality of starting devices.

BACKGROUND ART

There is known an engine starting device provided with a plurality of starting devices including a starter capable of starting an engine and a motor/generator capable of starting an engine (refer to JP2000-161102A). In this engine starting device, the starter is driven only under a limited condition such as an extremely low temperature.

SUMMARY OF INVENTION

However, in a case where the starter is driven only under a limited condition such as an extremely low temperature as described above, a non-driving period of the starter increases if the limited condition is not satisfied. If the starter is not used for a long time, each part of the starter may suffer from corrosion.

The invention provides a protection device for preventing corrosion in each part of the starter.

According to an aspect of the invention, there is provided a protection device of an engine starting device provided with a plurality of starting devices including a starter capable of starting an engine and a motor/generator capable of starting the engine, the engine being started by driving the motor/generator under a first condition, the engine being started by driving the starter under a second condition less generated than the first condition, wherein the starter is forcedly driven on a regular basis.

BRIEF DESCRIPTION OF DRAWINGS

The foregoing and additional features and characteristics of this disclosure will become more apparent from the following detailed description considered with the reference to the accompanying drawings, wherein.

DESCRIPTION OF EMBODIMENTS

Hereinafter, the invention will be described with reference to the accompanying drawings.

First Embodiment

Figure 1:
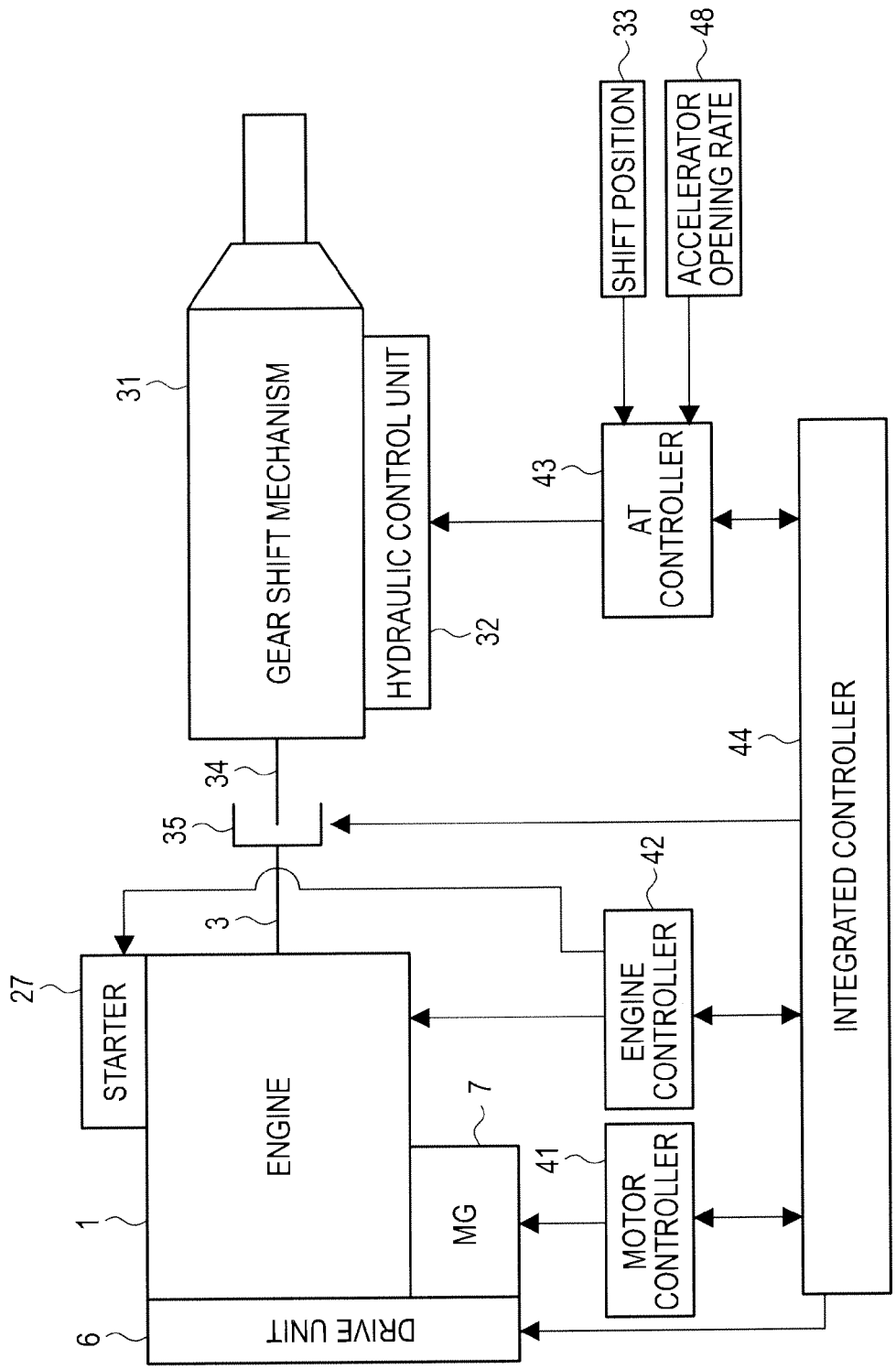
FIG. 1 is a schematic configuration diagram illustrating a hybrid vehicle having a protection device of an engine starting device according to a first embodiment.

FIG. 1 is a schematic configuration diagram illustrating a hybrid vehicle obtained by applying a protection device of an engine starting device according to a first embodiment of the invention. The hybrid vehicle is provided with different types of power sources. An engine 1 as a first power source includes an internal combustion engine such as a gasoline engine, a diesel engine, a liquified petroleum gas (LPG) engine, or a gas turbine engine. The engine 1 according to the present embodiment is a gasoline engine known in the art having a fuel injector, an intake/exhaust unit, an igniter, and the like.

Figure 2:
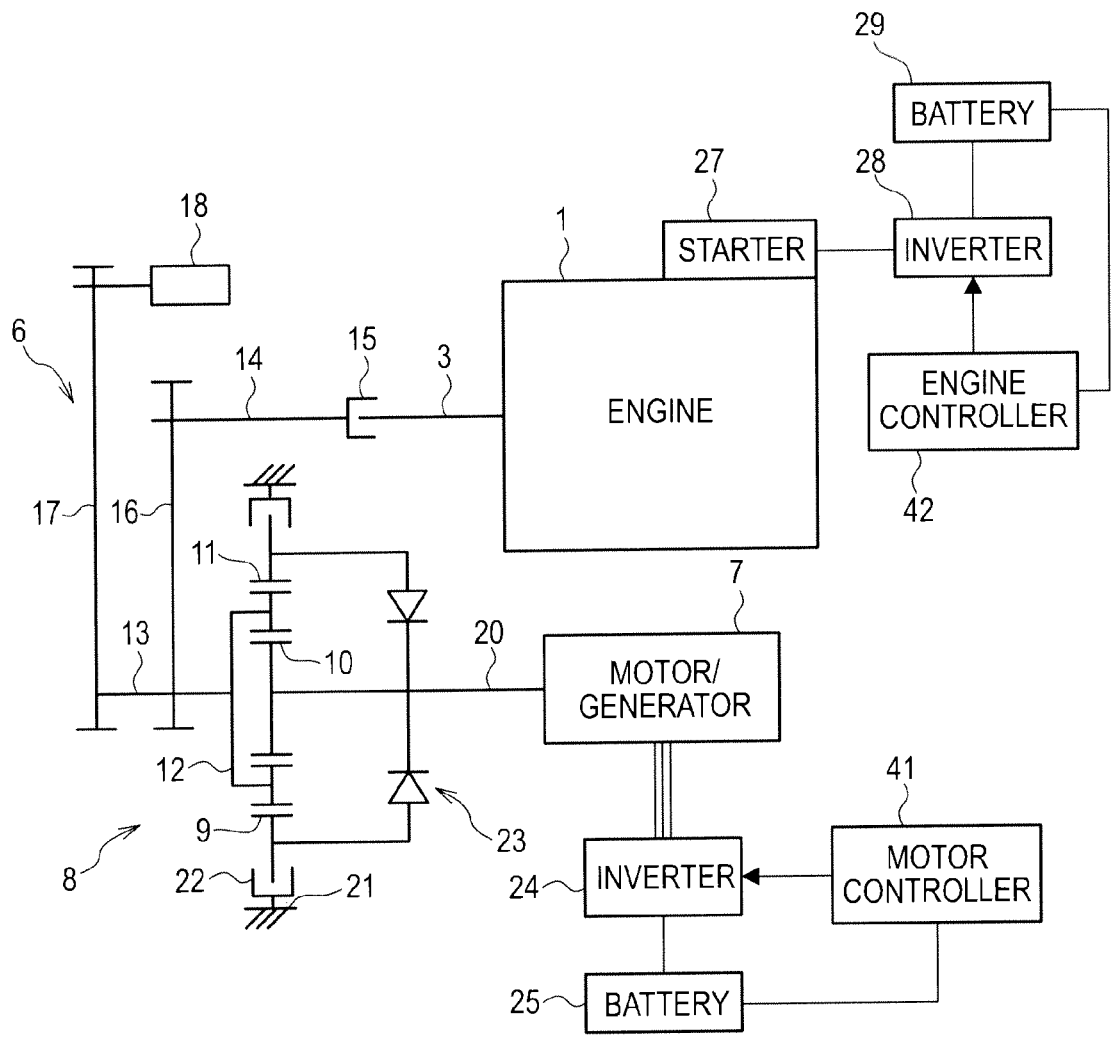
FIG. 2 is a schematic configuration diagram illustrating an engine starting device.

FIG. 2 is a schematic configuration diagram illustrating the starting device of the engine 1. In one end of a transmission path of the power (i.e., torque) output from the engine 1, a drive unit 6 and a motor/generator 7 are arranged. As the motor/generator 7, for example, an alternating current (AC) synchronous type motor/generator may be employed. The motor/generator 7 includes a rotor (not illustrated) having a permanent magnet (not illustrated) and a stator (not illustrated) obtained by winding a coil (not illustrated). In addition, as a three-phase AC current flows to a three-phase coil, a rotational magnetic field is generated. A torque is generated by controlling the rotational magnetic field depending on a rotational position and a rotational velocity of the rotor. The torque generated by the motor/generator 7 is proportional to the magnitude of the electric current. The rotational velocity of the motor/generator 7 is controlled by a frequency of the AC current.

The drive unit 6 has a decelerator 8. The decelerator 8 is connected to the engine 1 and the motor/generator 7.

The decelerator 8 includes a ring gear 9 and a sun gear 10 concentrically arranged and a plurality of pinion gears 11 meshing with the ring gear 9 and the sun gear 10. A plurality of pinion gears 11 are held by a carrier 12, and the carrier 12 is connected to a rotational shaft 13. In addition, a rotational shaft 14 is provided concentrically with the crankshaft 3 of the engine 1, and a clutch mechanism 15 is provided to connect or disconnect the rotational shaft 14 and the crankshaft 3. A chain 16 for transmitting a torque is provided between the rotational shafts 14 and 13. In addition, an accessory 18 such as air-conditioning compressor is connected to the rotational shaft 13 using a chain 17.

The motor/generator 7 has an output shaft 20, and the sun gear 10 is installed in the output shaft 20. The casing 21 of the drive unit 6 is provided with a brake 22 for stopping rotation of the ring gear 9. In addition, a free wheeling clutch 23 is arranged around the output shaft 20. An inner wheel of the free wheeling clutch 23 is connected to the output shaft 20, and an outer wheel of the free wheeling clutch 23 is connected to the ring gear 9.

Using the decelerator 8 having such a configuration, a torque is transmitted between the engine 1 and the motor/generator 7, or deceleration is performed. In addition, the free wheeling clutch 23 is engaged when the power output from the engine 1 is transmitted to the motor/generator 7.

The motor/generator 7 has a function of a motor for starting the engine 1, a function of an electric generator (alternator) for generating electricity by virtue of power of the engine 1, and a function of driving an accessory 18 when the engine 1 stops. In a case where the motor/generator 7 serves as a motor, a direct current (DC) voltage from the battery 25 is converted into an AC voltage using the inverter 24, and the AC voltage is supplied to the motor/generator 7.

In a case where the engine 1 starts using the motor/generator 7, the clutch mechanism 15 and the brake 22 are engaged, and the free wheeling clutch 23 is released. In a case where the motor/generator 7 serves as an alternator, the clutch mechanism 15 and the free wheeling clutch 23 are engaged, and the brake 22 is released. In a case where the motor/generator 7 is used to drive the accessory 18, the brake 22 is engaged, and the clutch mechanism 15 and the free wheeling clutch 23 are released.

The high voltage battery 25 capable of outputting a higher voltage than that of the battery 29 described below is connected to the motor/generator 7 through the inverter 24. In addition, the electric energy generated by the motor/generator 7 can be used to charge the battery 25 through the inverter 24. Furthermore, in a case where the motor/generator 7 serves as a generator, an inductive voltage generated by virtue of rotation of the rotor is converted into a DC voltage using the inverter 24, and the DC voltage is used to charge the battery 25.

The motor controller 41 has a function of detecting or controlling a current value supplied from the battery 25 to the motor/generator 7 or a current value generated by the motor/generator 7. In addition, the motor controller 41 has a function of controlling a rotational velocity of the motor/generator 7 and a function of detecting and controlling a state of charge (SOC) of the battery 25. In addition, the rotational velocity of the motor/generator 7 can be controlled within a range of, for example, 0 to 6000 rpm and the torque of the motor/generator 7 can be controlled within a range of, for example, 0 to 120 N·m based on its characteristics.

Meanwhile, a starter 27 is provided as another starting device for starting the engine 1. The starter 27 is one of those known in the art such as a magnetic shift type starter or a reduction gear type starter. The starter 27 according to the present embodiment is a magnetic shift type starter. In addition, a pinion gear (not illustrated) is provided in an output shaft (not illustrated) of a motor (starter motor). Meanwhile, a ring gear (not illustrated) is provided in a flywheel (not illustrated) of the crankshaft 3. In addition, the pinion gear meshes with the ring gear to start the engine 1. After the start of the engine 1, the pinion gear is released from the ring gear.

The battery 29 is connected to the starter 27 through the inverter 28. The DC voltage from the battery 29 is converted into an AC voltage through the inverter 28, and the AC voltage is supplied to the starter 27 to drive the starter 27. A rotational velocity of the starter 27 can be controlled within a range of, for example, 0 to 400 rpm and a torque of the starter 27 can be controlled within a range of, for example, 0 to 12 N·m based on its characteristics. In this manner, the motor/generator 7 and the starter 27 are different from each other in their characteristics.

In this manner, it is possible to start the engine 1 using at least one of the motor/generator 7 or the starter 27. In a case where the engine 1 starts at an extremely low temperature, the starter 27 is used.

Returning to FIG. 1, a gear shift mechanism 31 is provided in the other side of the power transmission path of the engine 1. This gear shift mechanism 31 is one of those known in the art having a plurality of planetary gear mechanisms (not illustrated) and a frictional engagement unit (not illustrated) such as clutch or a brake. In addition, a hydraulic control unit 32 is provided so as to control an engagement/release state of the frictional engagement unit, an engagement pressure of the frictional engagement unit, or the like. The hydraulic control unit 32 is one of those known in the art having various solenoid valves and the like.

In addition, a shift position sensor 33 is provided to detect a position of a selector for controlling the gear shift mechanism 31 and the hydraulic control unit 32 through a manual operation. In addition, various shift positions can be selected through the manual operation of the selector. For example, the shift position may include a park (P) position, a reverse (R) position, a neutral (N) position, a drive (D) position, a 4th gear position, a 3rd gear position, a 2nd gear position, and a low (L) gear position. While the gear position is set to the D position, the 4th gear position, the 3rd gear position, or the 2nd gear position, an AT controller 43 controls the frictional engagement unit based on a vehicle travel state by using the hydraulic control unit 32. As a result, the gear shift ratio of the gear shift mechanism 31 is automatically controlled.

Between the input shaft 34 of the gear shift mechanism 31 and the crankshaft 3, a selectively engageable/releasable clutch mechanism 35 is arranged. An engagement/release state of the clutch mechanism 35 is controlled, for example, by a hydraulic supply/discharge operation.

The integrated controller 44 controls an engine operation using a control instruction to the engine controller 42, an operation of the motor/generator 7 using a control instruction to the motor controller 41, and an operation of the gear shift mechanism 31 using a control instruction to the AT controller 43. In addition, the integrated controller 44 controls engagement/release of the clutch mechanism 35 using a control instruction to the clutch mechanism 35. The motor controller 41, the engine controller 42, the AT controller 43, and the integrated controller 44 communicate with each other via a bidirectional communication network such as a controller area network (CAN).

In a case where the starter 27 is used (driven) under a limited condition such as an extremely low temperature as described above, a non-driving period (unused period) of the starter 27 may increase unless the limited condition is satisfied. Accordingly, each part of the starter 27 may corrode. Here, "corrosion" includes rust in a component (for example, a brush, a commutator, a shaft, a plunger, and a pinion gear) of the starter 27 or sticking (fixing) between a pinion gear and a pinion shaft, caused by the rust.

For example, if rust is generated in a portion where the brush makes contact with the commutator, an electric current flow from the brush to the commutator is blocked, so that it is difficult to drive the starter 27 and start the engine 1. Meanwhile, the pinion gear is provided in an outer circumference of the pinion shaft so that the pinion gear can move along an axial direction of the pinion shaft. However, if rust is generated between the pinion gear and the outer circumference of the pinion shaft, the pinion gear is stuck, so that it is difficult to start the engine 1.

If the starter 27 is used (driven) even occasionally, such rust or sticking of the pinion gear can be prevented. For example, if the commutator is rotated as the brush makes contact even when rust is generated in a portion where the brush makes contact with the commutator, the rust may be clearly removed by virtue of friction between the brush and the commutator. In addition, if the pinion shaft moves along the outer circumference of the pinion shaft by driving the commutator using the brush even when rust is slightly generated between the pinion gear and the outer circumference of the pinion shaft, the rust may be clearly removed by virtue of friction between the pinion gear and the pinion shaft. That is, a small amount of rust can be removed by driving a mechanical component (starter).

In this regard, according to the first embodiment of the invention, in order to prevent rust in the starter 27 or sticking of the pinion gear, the starter 27 is forcedly driven on a regular basis.

This control executed by the integrated controller 44 will be described with reference to the accompanying flowcharts.

Figure 3:
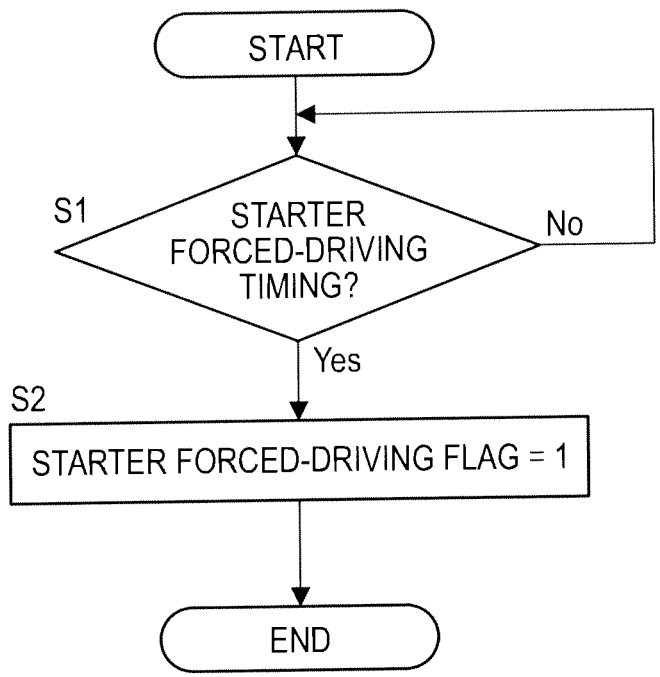
FIG. 3 is a flowchart illustrating setting of a starter forced-driving flag according to the first embodiment.

FIG. 3 is a flowchart illustrating setting of a starter forced-driving flag. The flowchart of FIG. 3 just illustrates a flow of processing and is not executed repeatedly or cyclically.

In step S1, it is determined whether or not it is a forced-driving timing of the starter 27. A driving timing of the starter 27 may include:

(1) when any one of the batteries 25 or 29 is exchanged;
(2) whenever a hybrid vehicle travels by a predetermined distance;
(3) whenever a start operation of the engine 1 is performed by a predetermined frequency; or
(4) whenever an operation time of a hybrid vehicle or an operation time of the engine 1 elapses by a predetermined time.

The predetermined distance of the condition (2), the predetermined frequency of the condition (3), and the predetermined time of the condition (4) are appropriately set in advance. The travel distance of a hybrid vehicle, the frequency of an engine start operation, the operation time of a hybrid vehicle, or the operation time of the engine 1 are detected or computed. It is determined that it is not a forced-driving timing of the starter 27 when any one of the batteries 25 and 29 is not exchanged, when the travel distance of a hybrid vehicle after the previous starter driving does not reach a predetermined distance, or when an engine start frequency after the previous starter driving does not reach a predetermined frequency. In addition, it is also determined that it is not a forced-driving timing of the starter 27 when the operation time of a hybrid vehicle or the operation time of the engine 1 after the previous starter driving does not elapse by a predetermined time. In such cases, the process waits.

Meanwhile, it is determined that it is the forced-driving timing of the starter 27 when it is time to exchange any one of the batteries 25 and 29, when the travel distance of a hybrid vehicle after the previous starter driving reaches a predetermined distance, or when an engine start frequency after the previous starter driving reaches a predetermined frequency. In addition, it is also determined that it is the forced-driving timing of the starter 27 when the operation time of a hybrid vehicle or the operation time of the engine 1 after the previous starter driving elapses by a predetermined time.

In step S1, if it is determined that it is a forced-driving timing of the starter 27, the process advances to step S2, and the starter forced-driving flag is set to 1. In a case where the condition (1) is employed, the starter forced-driving flag is initially set to zero when a hybrid vehicle is shipped in a factory. In a case where one of the condition (2) to (4) is employed, the starter forced-driving flag is initially set to zero when a hybrid vehicle starts to drive.

Figure 4:
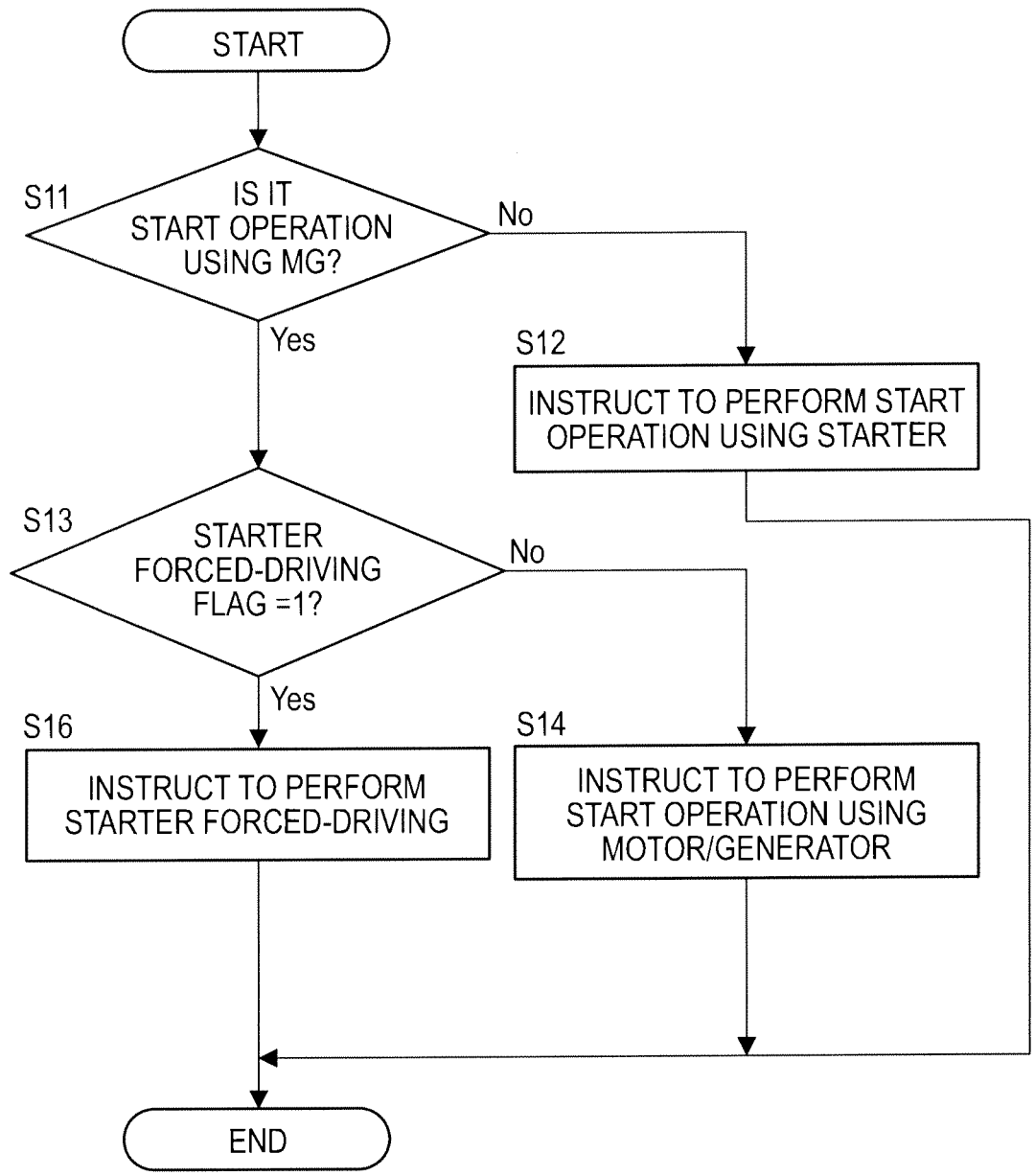
FIG. 4 is a flowchart illustrating a start operation according to the first embodiment.

FIG. 4 is a diagram illustrating a start operation (start control) of a hybrid vehicle. The flowchart of FIG. 4 just illustrates a flow of processing and is not executed repeatedly or cyclically. In a relationship with FIG. 3, the flow of FIG. 4 is connected to the flow of FIG. 3.

In step S11, it is determined whether or not the start operation is performed using the motor/generator 7. Here, at a normal temperature (first condition), a start operation using the motor/generator 7 is usually performed. A start operation using the starter 27 is performed under a limited condition such as an extremely low temperature (second condition). This is because, under such an extremely low temperature, a high driving torque is necessary, compared to the normal temperature.

If it is determined that it is not the start operation using the motor/generator 7, that is, at the time of an extremely low temperature, it is determined that a start operation using the starter 27 is performed. If so, the process advances to step S12, and a fact that the engine start operation is to be performed using the starter 27 is instructed to the engine controller 42. In response to this instruction, the engine controller 42 drives the starter 27 to perform cranking to start the engine 1 while a fuel is supplied to the engine 1, and a spark ignition is performed.

Here, a chance of the extremely low temperature is a rare case, and the start operation using the motor/generator 7 is typically performed in most cases (unless the extremely low temperature). When the start operation using the motor/generator 7 is performed, the process advances to the step S13. In step S13, the starter forced-driving flag set in FIG. 3 is referenced.

When the starter forced-driving flag is set to zero, it is determined that it is not the forced-driving timing of the starter 27, and the process advances to step S14, so that a fact that the engine 1 is to start using the motor/generator 7 is instructed to the motor controller 41 and the engine controller 42. In response to this instruction, the motor controller 41 drives the motor/generator 7 to perform cranking while the engine controller 42 supplies a fuel to the engine 1 and performs a spark ignition. As a result, the engine 1 is started.

Meanwhile, when the starter forced-driving flag is set to "1," it is determined that it is a forced-driving timing of the starter 27, and the process advances to step S16. In step S16, the starter 27 instructs the engine controller 42 to perform the forced driving. In response to this instruction, the engine controller 42 performs control such that the starter 27 is driven to perform cranking while a fuel is supplied to the engine 1, and a spark ignition is performed. As a result, the engine 1 is started.

In this case, when the starter forced-driving flag is set to "1," the engine cranking may be performed by driving both the motor/generator 7 and the starter 27.

Figure 5:
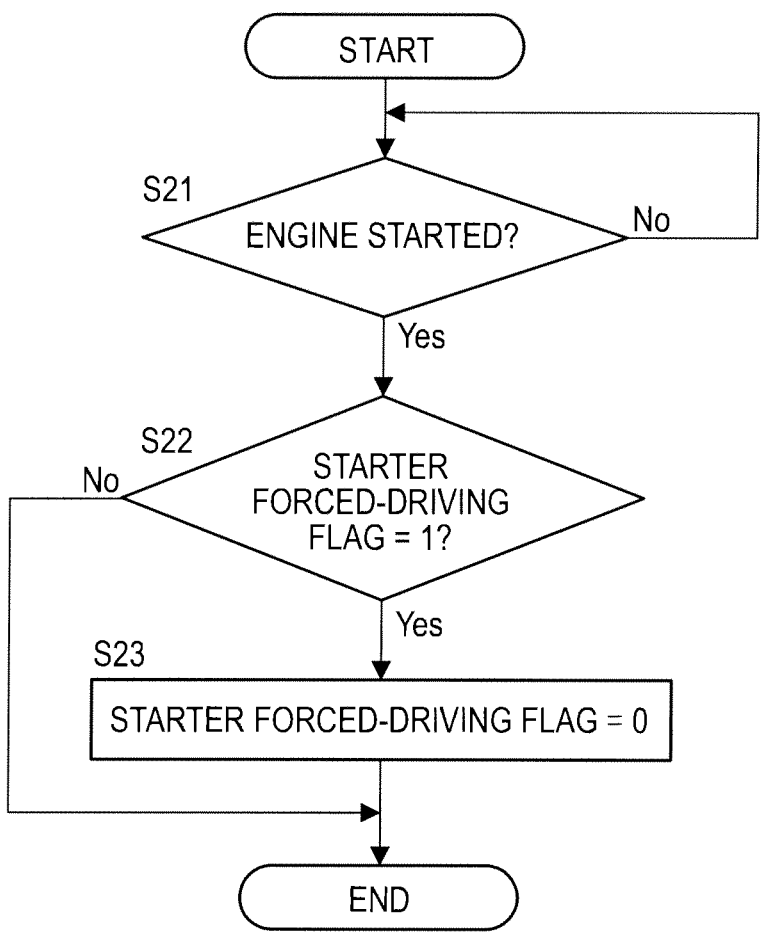
FIG. 5 is a flowchart illustrating a starter forced-driving post-processing according to the first embodiment.

FIG. 5 illustrates a post-processing of the forced-driving of the starter 27. Similarly, the flowchart of FIG. 5 just illustrates a flow of processing and is not executed repeatedly or cyclically. In a relationship with FIG. 4, the flow of FIG. 5 is connected to the flow of FIG. 4.

In step S21, it is determined whether or not the engine 1 has been started. This is recognized by observing an engine rotational velocity using the engine controller 42. This information is transmitted to the integrated controller 44. If the engine 1 has not been started, the process waits.

As the engine 1 is started, it is determined that it is time to terminate the forced-driving of the starter 27, so that the process advances from step S21 to step S22, and the starter forced-driving flag is referenced. When the starter forced-driving flag is set to "1," in order to terminate the forced driving of the starter 27, the process advances to step S23, and the starter forced-driving flag is set to zero. Based on "starter forced-driving flag=0," in the next time, the process advances to steps S11, S13, and S14 in FIG. 4, so that an engine start operation using the motor/generator 7 is instructed.

Here, effects of the first embodiment will be described.

According to the first embodiment, there are provided a plurality of starting devices of the engine 1, including the starter 27 capable of starting the engine 1 and the motor/generator 7 also capable of starting the engine 1, wherein the starter 27 is driven only at an extremely low temperature (under a predetermined limited condition), and the starter 27 is forcedly driven at the forced-driving timing of the starter 27 (refer to steps S1 and S2 in FIG. 3 and steps S11, S13, and S16 in FIG. 4). That is, since the starter 27 is forcedly driven on a regular basis, there is a chance to drive the starter 27 in addition to an extremely low temperature. As a result, it is possible to prevent an increase of a non-driving period (unused period) and corrosion of the starter 27 even when an extremely low temperature is not generated.

If the starter 27 is forcedly driven to perform cranking even when there is no start request of the engine 1, a driving noise is undesirably generated. In this consideration, according to the first embodiment, the starter 27 is forcedly driven by cranking at the time of engine start (refer to steps S11, S13, and S16 of FIG. 4). Therefore, it is possible to suppress generation of a noise.

If the starter 27 is forcedly driven in a case where the cranking at the time of engine start is performed by driving the motor/generator 7, another noise is undesirably generated. In this consideration, according to the first embodiment, in a case where the cranking at the time of engine start is performed by driving the motor/generator 7, the starter 27 is forcedly driven without driving the motor/generator 7 (refer to steps S11, S13, and S16 of FIG. 4). Therefore, it is possible to prevent generation of another noise.

The protection device of the engine starting device according to the first embodiment may be applied to other types of hybrid vehicles other than the hybrid vehicle having the configuration of FIG. 1.

Figure 6:
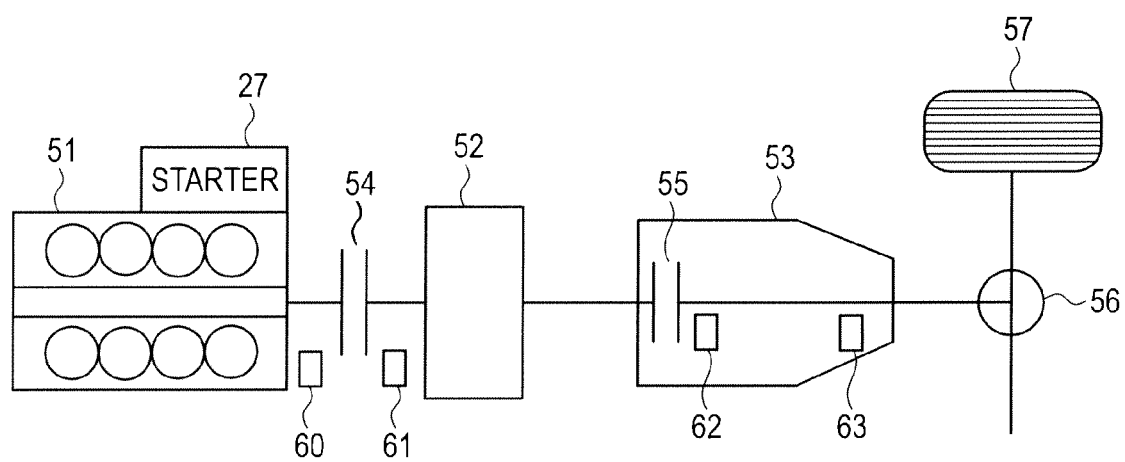
FIG. 6 is a diagram schematically illustrating a schematic configuration of a power train system of a hybrid vehicle having another configuration obtained by applying the protection device of the engine starting device according to the first embodiment.

FIG. 6 is a diagram schematically illustrating a configuration of the power train system of a hybrid vehicle having another configuration obtained by applying the protection device of the engine starting device according to the first embodiment.

The output shaft of the engine 51 as an internal combustion engine is connected to the input shaft of the motor/generator 52 (MG) as an electric motor also serving as a generator through a first clutch 54 (CL1) having a variable torque capacity. The output shaft of the motor/generator 52 is connected to the input shaft of the automatic transmission 53 (AT), and the output shaft of the automatic transmission 53 is connected to a tire 57 through a differential gear 56.

The automatic transmission 53 automatically switches a gear shift ratio (performs gear shift control) of a gear having forward 5-speed and backward 1-speed gear positions or forward 6-speed and backward 1-speed gear positions depending on a vehicle speed or an accelerator opening rate.

One of variable torque capacity clutches responsible for power transmission in different automatic transmissions 53 is used as a second clutch 55 (CL2) depending on a shift state. In other words, the second clutch 55 is a frictional engagement element provided in a power transmission path of each gear position out of a plurality of frictional engagement elements provided as a gearshift element of the automatic transmission 53. Substantially, the second clutch 55 is provided inside the automatic transmission 53.

The automatic transmission 53 combines the power of the engine 51 input through the first clutch 54 and the power input from the motor/generator 52 and outputs the combined power to the tire 57. The first and second clutches 54 and 55 may include, for example, a wet type multi-plate clutch capable of continuously controlling a flow rate and a flow pressure of the hydraulic fluid using a proportional solenoid.

The power train system has two drive modes depending on a connection state of the first clutch 54. That is, while the first clutch 54 is disconnected, an electric vehicle (EV) mode is selected in which only the power of the motor/generator 52 is used in a travel. While the first clutch 54 is connected, a hybrid electric vehicle (HEV) mode is selected in which the power of the engine 51 and the power of the motor/generator 52 are used in a travel.

The engine rotation sensor 60 detects a rotational number of the engine 1, and the MG rotation sensor 61 detects a rotational number of the motor/generator 52. The AT input rotation sensor 62 detects a rotational number of the input shaft of the automatic transmission 53, and the AT output rotation sensor 63 detects a rotational number of the output shaft of the automatic transmission 52. Detection signals of each of these sensors 60 to 63 are input to the integrated controller 70 described below.

Figure 7:
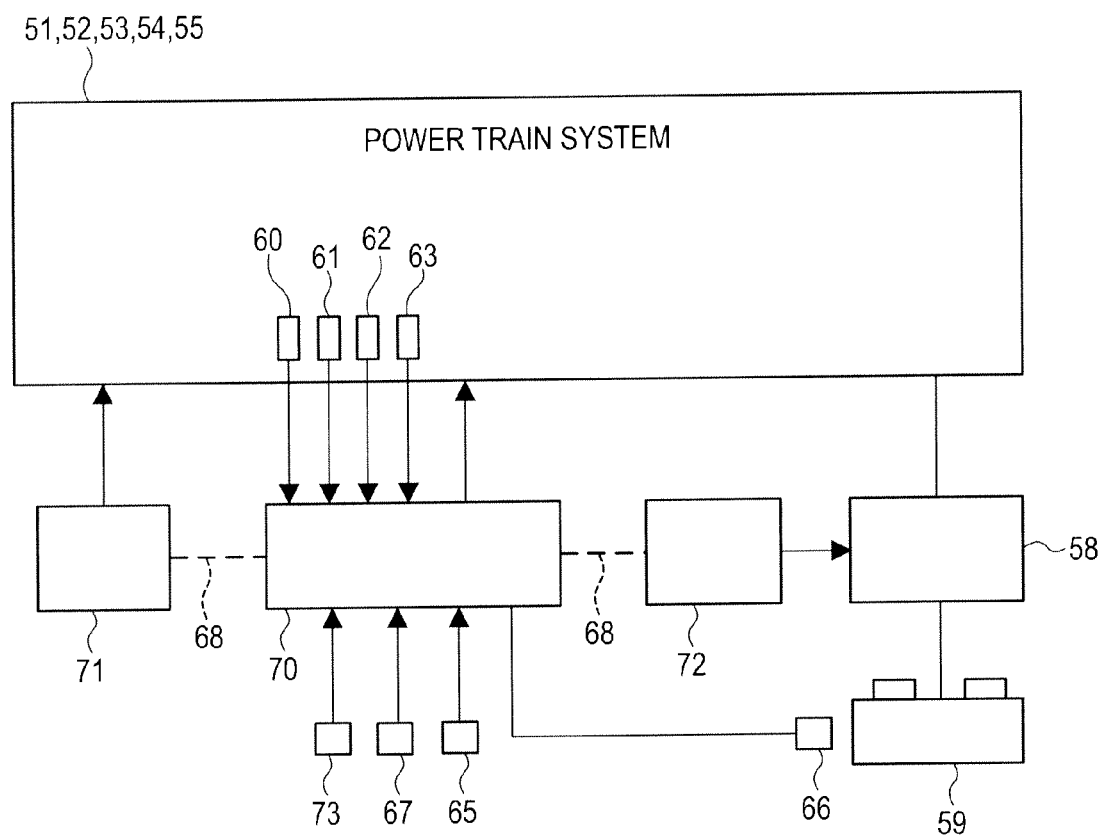
FIG. 7 is a system configuration diagram illustrating the hybrid vehicle of FIG. 6.

FIG. 7 illustrates a system configuration of the hybrid vehicle of FIG. 6. This hybrid vehicle includes an integrated controller 70 that integratedly controls a vehicle, an engine controller 71 that controls the engine 51, and a MG controller 72 that controls the motor/generator 52.

The integrated controller 70 is connected to the engine controller 71 and the MG controller 72 through a communication line 68 that can be used to exchange information.

This integrated controller 70 receives detection signals from various sensors such as a vehicle speed sensor 65 that detects a vehicle speed, an SOC sensor 66 that detects a state of charge (SOC) of the battery 59 used to supply power to the motor/generator 52, an accelerator opening rate sensor 67 that detects an accelerator opening rate (APO), and a brake hydraulic pressure sensor 73 that detects a hydraulic pressure in addition to detection signals from the engine rotation sensor 60, the MG rotation sensor 61, the AT input rotation sensor 62, and the AT output rotation sensor 63 described above.

The integrated controller 70 selects a drive mode capable of providing a drive force desired by a driver depending on the accelerator opening rate, the vehicle speed, and the SOC of the battery 59, instructs a target MG torque or a target MG rotational number to the MG controller 72, and instructs a target engine torque to the engine controller 71. In addition, engagement and release of the first and second clutches 54 and 55 are controlled based on the instruction from the integrated controller 70.

Figure 8:
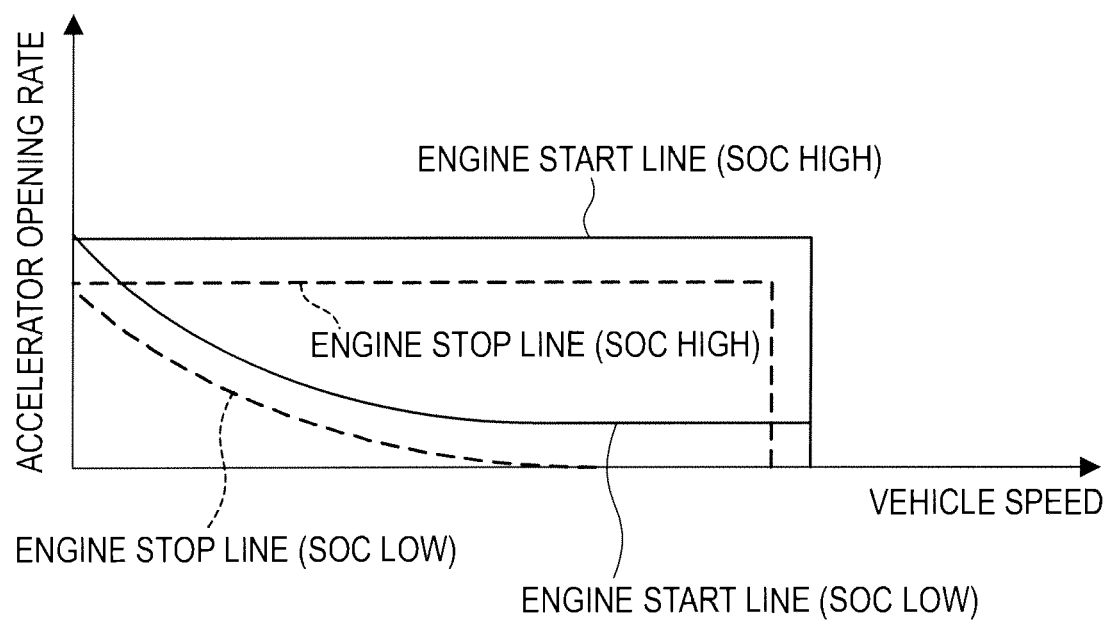
FIG. 8 is a diagram illustrating an exemplary characteristic of an engine start/stop line map.

In addition, the integrated controller 70 performs computation of the drive mode of the engine 1 based on the vehicle speed and the accelerator opening rate. That is, it is determined whether or not the engine starts or whether or not the engine stops based on an engine start/stop line map as illustrated in FIG. 8. The engine start line and the engine stop line vary to decrease the accelerator opening rate (toward the bottom in FIG. 8) as the SOC of the battery 59 decreases. In addition, if the SOC of the battery 59 is constant, the engine stop line is set to decrease the accelerator opening rate compared to the engine start line. That is, if the SOC of the battery 59 and the vehicle speed are constant, setting is performed such that the accelerator opening rate for stopping the engine 51 (the accelerator opening rate on the engine stop line) is smaller than the accelerator opening rate for starting the engine 51 (the accelerator opening rate on the engine start line).

In the start operation for starting the engine 51, a torque capacity of the second clutch 55 is controlled to make a slip as the second clutch 55 has a half-clutch state when the accelerator opening rate exceeds the engine start line of FIG. 8 in the EV mode. After it is determined that a slip of the second clutch 55 is initiated, the engagement of the first clutch 54 is initiated to increase the engine rotational number. As the engine rotational number reaches an initial explosion rotational number, the engine 51 is operated, and the first clutch 54 is perfectly engaged at a certain time when the MG rotational number and the engine rotational number are close to each other. Then, the second clutch 55 is locked up, and the mode transitions to the HEV mode.

The engine controller 71 controls the engine 51 in response to the instruction from the integrated controller 70.

The MG controller 72 controls the inverter 58 used to drive the motor/generator 52 in response to the instruction from the integrated controller 70. The operations of the motor/generator 52 such as power running using the power supplied from the battery 59, regenerative driving in which the motor/generator 52 serves as a generator to charge the battery 59, and switching between start and stop are controlled by the MG controller 72. The output power (current value) of the motor/generator 52 is monitored by the MG controller 72.

Similarly, in the hybrid vehicle having the configuration of FIG. 6, the start operation using the motor/generator 52 is performed in most cases at a normal temperature (first condition), and the start operation using the starter 27 is performed in a case where a limited condition such as an extremely low temperature is satisfied. In addition, as a forced drive timing of the starter 27 is reached, the starter 27 is forcedly driven.

Second, Third, and Fourth Embodiments

Figure 9:
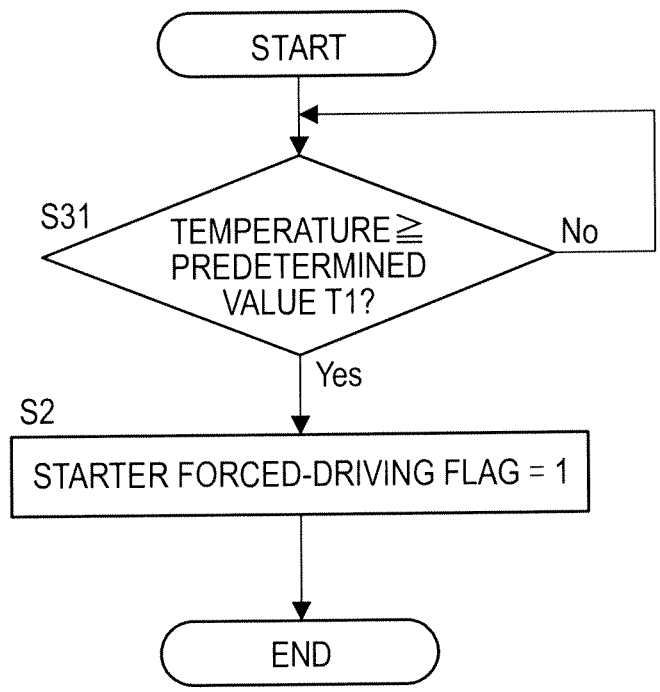
FIG. 9 is a flowchart illustrating setting of a starter forced-driving flag according to a second embodiment.
Figure 10:
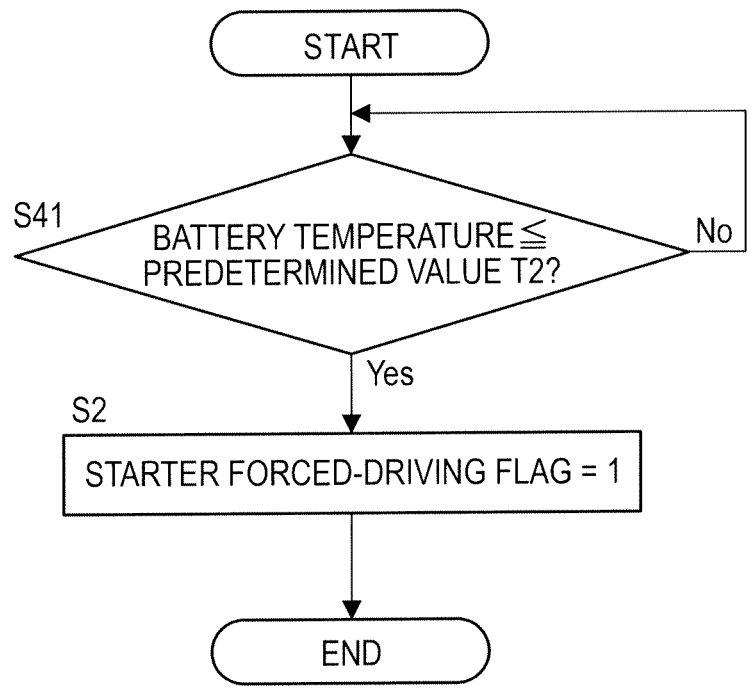
FIG. 10 is a flowchart illustrating setting of a starter forced-driving flag according to a third embodiment.
Figure 11:
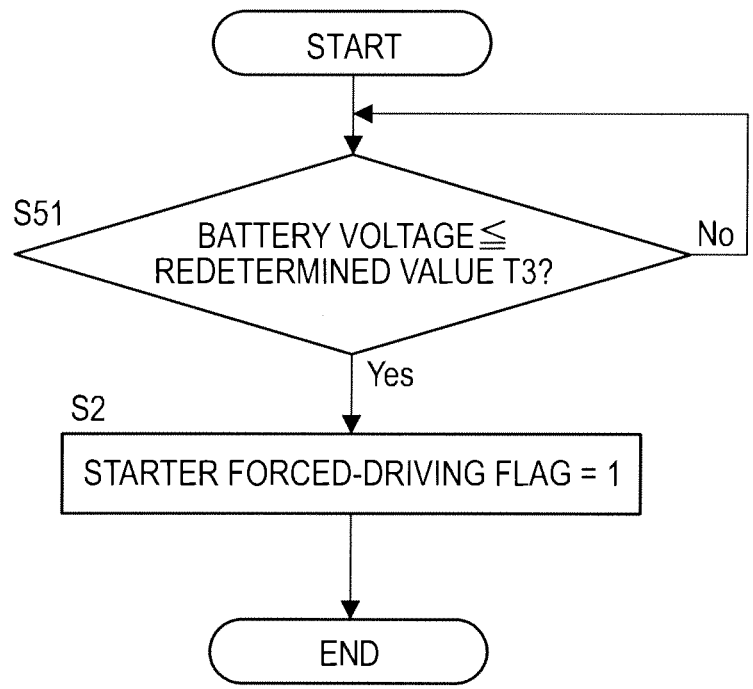
FIG. 11 is a flowchart illustrating setting of a starter forced-driving flag according to a fourth embodiment.

FIGS. 9, 10, and 11 illustrate setting of the starter forced-driving flag according to the second, third, and fourth embodiments, respectively, corresponding to FIG. 3 of the first embodiment. Like reference numerals denote like elements as in FIG. 3. FIGS. 4 and 5 are similarly incorporated into the second, third, and fourth embodiments.

Description will now be made for the parts different from those of the first embodiment. According to the second embodiment illustrated in FIG. 9, in step S31, a temperature such as an outdoor air temperature or a cooling water temperature is compared with a predetermined value T1. The outdoor air temperature may be detected using an outdoor air temperature sensor (not illustrated), and the cooling water temperature may be detected using a water temperature sensor (not illustrated). When a temperature such as the outdoor air temperature or the cooling water temperature is equal to or higher than a predetermined value T1 (for example, 40° C.), the process advances to step S2, and the starter forced-driving flag is set to "1."

According to the third embodiment illustrated in FIG. 10, in step S41, the temperature of the battery 25 or 29 is compared with a predetermined value T2. The temperature of the battery 25 or 29 may be detected using a temperature sensor (not illustrated). When the temperature of the battery 25 or 29 is equal to or lower than a predetermined value T2, the process advances to step S2, and the starter forced-driving flag is set to "1."

According to the fourth embodiment illustrated in FIG. 11, in step S51, the voltage of the battery 25 or 29 is compared with a predetermined value T3. The voltage of the battery 25 is recognized by the motor controller 41, and the voltage of the battery 29 is recognized by the engine controller 42. When the voltage of the battery 25 or 29 is equal to or lower than a predetermined value T3, the process advances to step S2, and the starter forced-driving flag is set to "1."

Since it is desirable that the starter 27 is operated on a regular basis, the predetermined values T1, T2, and T3 of FIGS. 9, 10, and 11, respectively, are appropriately set in advance. The determination results of steps S31, S41, and S51 of FIGS. 9, 10, and 11, respectively, may be reversely set.

When the starter forced-driving flag is set to "1," in the second, third, and fourth embodiments, the engine 1 starts using the starter 27 (refer to steps S11, S13, and S16 of FIG. 4). Specifically, according to the second embodiment, the starter 27 is forcedly driven when the temperature such as the outdoor air temperature or the cooling water temperature is equal to or higher than the predetermined value T1. According to the third embodiment, the starter 27 is forcedly driven when the temperature of the battery 25 or 29 is equal to or lower than the predetermined value T2. In addition, according to the fourth embodiment, the starter 27 is forcedly driven when the voltage of the battery 25 or 29 is equal to or lower than the predetermined value T3. That is, there is a chance to drive the starter 27 in addition to a case of the extremely low temperature.

In this manner, according to the second, third, and fourth embodiments, the starter 27 is forcedly driven when a forced driving timing of the starter 27 is reached (on a regular basis). Therefore, it is possible to obtain the same effects as those of the first embodiment.

Fifth Embodiment

Figure 12:
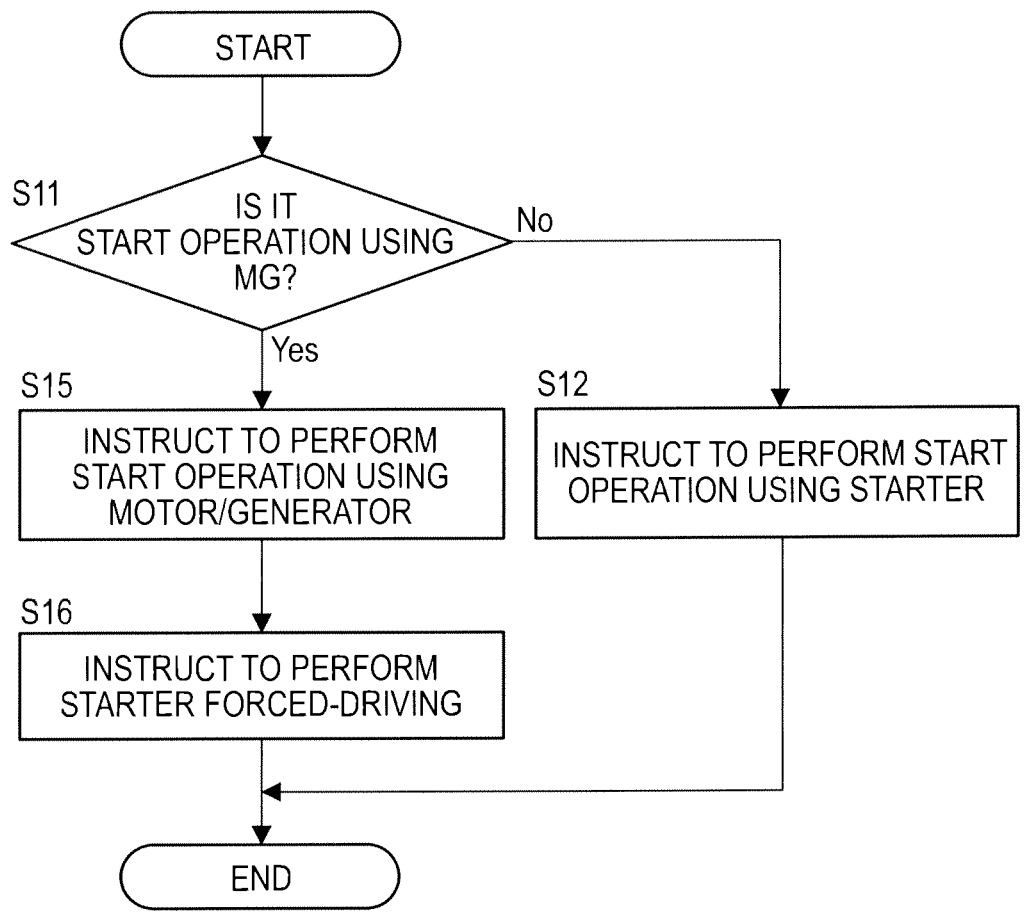
FIG. 12 is a flowchart illustrating a start operation according to a fifth embodiment.

FIG. 12 illustrates a start operation according to the fifth embodiment. FIG. 12 corresponds to FIG. 4 of the first embodiment. Like reference numerals denote like elements as in FIG. 4.

According to the first embodiment, the starter 27 is forcedly driven at the forced-driving timing of the starter 27. According to the fifth embodiment, a start timing of the motor/generator 7 is employed as the forced-driving timing of the starter 27. For this reason, according to the fifth embodiment, it is not necessary to use a starter forced-driving flag. Therefore, a diagram corresponding to FIG. 3 of the first embodiment is not provided.

Description will now be made for the portions different from those of the first embodiment. Referring to FIG. 12, in step S11, in the case of a start operation using the motor/generator 7, the process advances to steps S15 and S16. In step S15, a fact that the engine 1 is to be started using the motor/generator 7 is instructed to the motor controller 41 and the engine controller 42. In response to this instruction, the motor controller 41 drives the motor/generator 7 to perform cranking while the engine controller 42 supplies a fuel to the engine 1 and performs a spark ignition. As a result, the engine 1 starts.

In step S16, a fact that the starter 27 is to be forcedly driven is instructed to the engine controller 42. In response to this instruction, the engine controller 42 drives the starter 27 to perform cranking.

Figure 13:
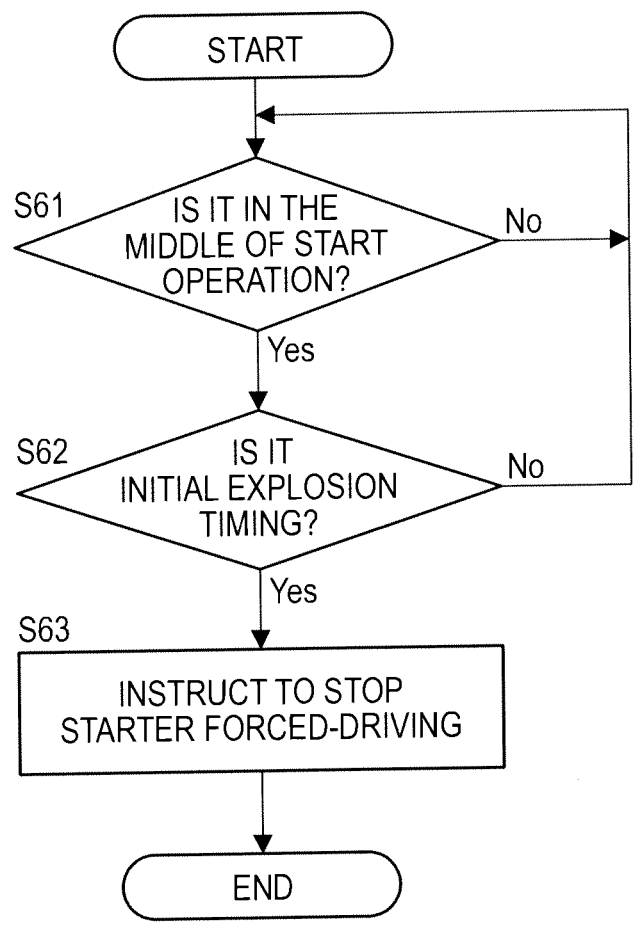
FIG. 13 is a flowchart illustrating a starter forced-driving post-processing according to the fifth embodiment.

FIG. 13 illustrates a post-processing of the forced driving of the starter 27 according to the fifth embodiment, which corresponds to FIG. 5 of the first embodiment. In a relationship with FIG. 12, the flow of FIG. 13 is executed after the flow of FIG. 12.

Referring to FIG. 13, in step S61, it is determined whether or not the engine 1 is in the start operation. The engine controller 42 determines whether or not the engine 2 is in the start operation based on the input engine rotational velocity. This information is transmitted to the integrated controller 44. If the engine 1 is not in the start operation, the process waits.

If the engine 1 is in the start operation, the process advances from step S61 to step S62. In step S62, it is observed whether or not it is an initial explosion timing of the engine 1. Whether or not it is an initial explosion timing of the engine 1 is determined by the engine controller 42 based on the engine rotational velocity. For example, if the engine rotational velocity increases and becomes equal to or higher than the initial explosion rotational velocity determined in advance as the cranking is initiated, it is determined that it is the initial explosion timing of the engine 1. This information is transmitted to the integrated controller 44. If it is not the initial explosion timing of the engine 1, the process returns to steps S61 and S62 and waits.

If it is the initial explosion timing of the engine 1, it is determined that it is a forced-driving termination timing of the starter 27, and the process advances from step S62 to step S63, so that termination of the forced driving of the starter 27 is instructed to the engine controller 42. In response to this instruction, the engine controller 42 stops the forced driving of the starter 27.

Here, description will be made for a reason why the forced driving of the starter 27 stops at the initial explosion timing. The forced driving of the starter 27 is instructed in step S16 of FIG. 12 because there is a desire to move the starter 27 even slightly in order to protect the starter 27 from corrosion. There is no intention of assisting a function of the motor/generator 7.

That is, the starter 27 may move even slightly as long as there is no influence on a function of the motor/generator 7. For this reason, it is necessary to terminate the driving of the starter 27 within a short time. Description will be made in more detail, for example, for 4-cylinder in-line engine. During the cranking, a first explosion (initial explosion) is generated in any one of cylinders, and explosions are then sequentially generated in the remaining three cylinders. Here, assuming that first (initial explosion), second, third, and fourth explosions are generated in the explosion initiation sequence, the engine 1 starts after the fourth explosion. In this case, the starter 27 is forcedly driven immediately before the initial explosion is generated, and the forced driving of the starter 27 stops at the initial explosion timing.

According to the fifth embodiment, a start timing of the motor/generator 7 is employed as a forced-driving timing of the starter 27, and the starter 27 is forcedly driven whenever the engine starts. Therefore, it is possible to obtain the same effects as those of the first embodiment.

According to the fifth embodiment, the forced driving of the starter 27 stops at the initial explosion timing of the engine 1. However, the invention is not limited thereto. For example, the forced driving of the starter 27 may stop when a predetermined time elapses after the cranking is initiated. Here, the predetermined time is appropriately set in advance, for example, from the start of cranking to the initial explosion timing.

Sixth Embodiment

Figure 14:
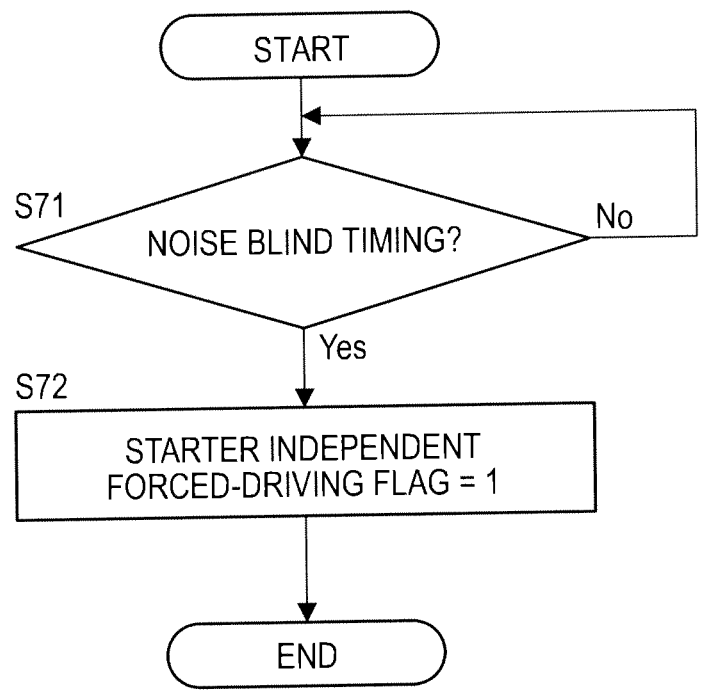
FIG. 14 is a flowchart illustrating setting of a starter independent forced-driving flag according to a sixth embodiment.
Figure 15:
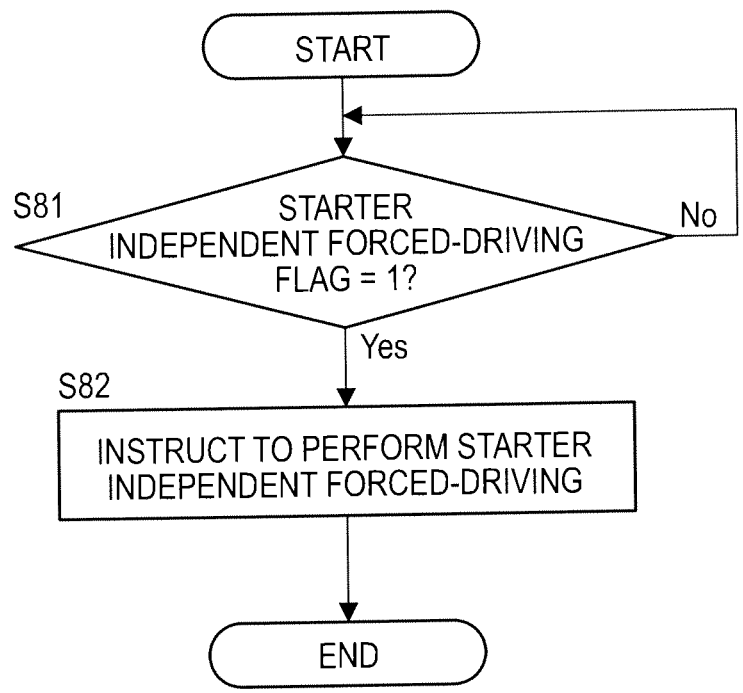
FIG. 15 is a flowchart illustrating an independent forced-driving processing of the starter according to the sixth embodiment.
Figure 16:
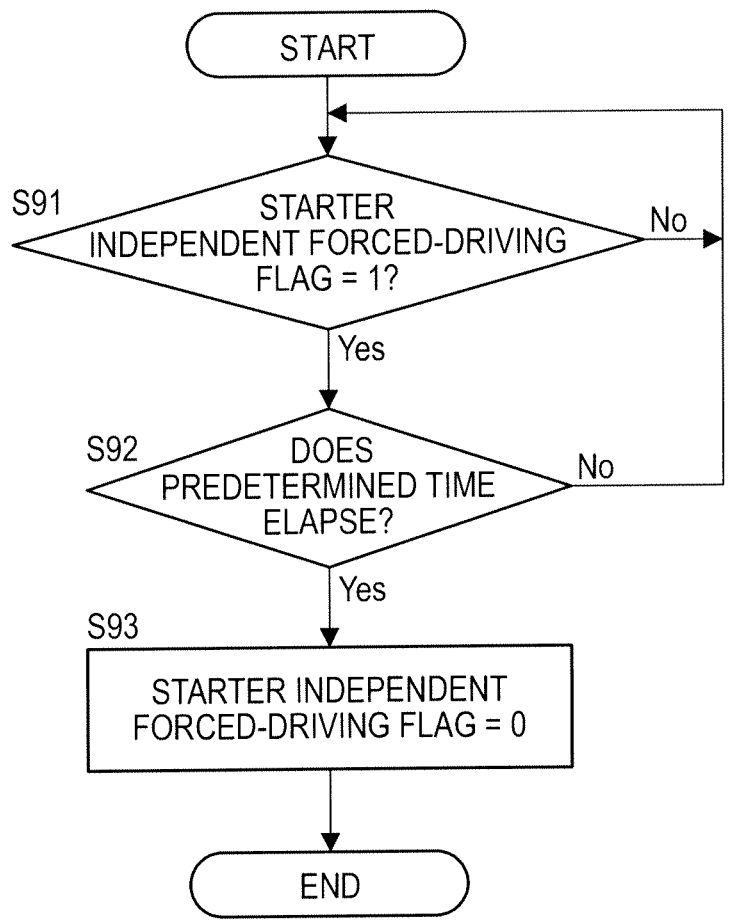
FIG. 16 is a flowchart illustrating an independent forced-driving post-processing of the starter according to the sixth embodiment.

FIGS. 14, 15, and 16 are flowcharts illustrating a processing according to the sixth embodiment. FIG. 14 illustrates setting of the starter independent forced-driving flag. FIG. 15 illustrates a processing of the starter independent forced-driving. FIG. 16 illustrates a post-processing of the starter independent forced-driving. FIGS. 14, 15, and 16 correspond to FIGS. 3, 4, and 5, respectively, of the first embodiment. The process is executed in the order of the flowcharts of FIGS. 14, 15, and 16.

In the first embodiment, a magnetic shift type starter 27 is employed, in which the pinion gear meshes with the ring gear as the motor (starter motor) is operated. Meanwhile, in the starter according to the sixth embodiment, a starter independent drive unit (not illustrated) capable of independently driving the starter in a mechanical sense, is provided unlike the starter 27 of the first embodiment. The phrase "capable of independently driving the starter" means that only the motor (starter motor) can be driven without causing the pinion gear to mesh with the ring gear. In other words, the phrase "capable of independently driving the starter" means that it is possible to cause the motor (starter motor) to run idle. According to the sixth embodiment, a starter having the starter independent drive unit is employed (only in the sixth embodiment, the starter having the starter independent drive unit is simply referred to as a "starter"). Therefore, in the starter having the starter independent drive unit, the starter may be independently driven (cause the starter to run idle) without influencing the engine 1. In this case, it is assumed that the starter having the starter independent drive unit is also controlled by the engine controller 42.

If the starter is used to start the engine 1 only at an extremely low temperature, the non-driving period (unused period) of the starter increases, and there is a possibility of generating corrosion in each part of the starter in a case where the extremely low temperature is not generated. In this regard, according to the sixth embodiment, a starter having the starter independent drive unit is employed, and the starter having the starter independent drive unit is forcedly driven at a noise blind timing.

Description will now be made for the portions different from those of the first embodiment. Referring to FIG. 14, in step S71, it is observed whether or not a noise blind timing is reached. Here, the "noise blind timing" refers to a timing when a background noise in a cabin is relatively high. If the starter is solely driven at the noise blind timing, and a background noise in a cabin of a hybrid vehicle is relatively high, a drive sound of the starter is concealed by a background noise in a cabin even when the starter is driven. Therefore, a fact that the starter is operated is not recognized by a driver in a cabin. For example, the noise blind timing may include a start timing of the engine 1 or a drive termination timing of a hybrid vehicle. In step S71, if it is not the noise blind timing, the process waits.

Meanwhile, if the noise blind timing is reached, the process advances from step S71 to step S72, so that the starter forced-driving flag (initially set to zero when a vehicle starts to drive) is set to "1."

Next, in FIG. 15, it is determined whether or not the starter independent forced-driving flag is set to "1" in step S81. The starter independent forced-driving flag is set in the processing of the flowchart of FIG. 14. If the starter independent forced-driving flag is set to zero, the process waits.

Meanwhile, if the starter independent forced-driving flag is set to "1," it is determined that the drive sound of the starter is concealed by a background noise in a cabin even when the starter is forcedly driven, so that the process advances from step S81 to step S82, and the starter independent forced-driving is instructed to the engine controller 42. In response to this instruction, the engine controller 42 causes the starter to perform independent forced-driving. In this case, if the engine 1 is not driven and has a stop state, a fuel is not supplied to the engine 1, and a spark ignition is not performed. That is, the starter is forcedly driven in order to protect the starter even when it is not necessary to start the engine 1.

Then, in step S91 of FIG. 16, it is determined whether or not the starter independent forced-driving flag is set to "1." The starter independent forced-driving flag is set in the processing of the flowchart of FIG. 14. When the starter independent forced-driving flag is set to zero, the process waits.

Meanwhile, when the starter independent forced-driving flag is set to "1," the process advances from step S91 to step S92, so that it is determined whether or not a predetermined time elapses after the starter independent forced-driving is initiated. The predetermined time defines a starter independent forced-driving time. This predetermined time is appropriately set in advance. The time after the starter independent forced-driving is initiated is measured. For example, it is possible to measure the time after the starter independent forced-driving is initiated by activating an internal timer of the engine controller 42 at the timing when the starter independent forced-driving is initiated. This information is transmitted to the integrated controller 44. If a predetermined time does not elapse after the starter independent forced-driving is initiated, the process returns to steps S91 and S92 and waits.

Meanwhile, if a predetermined time elapses after the starter independent forced-driving is initiated in step S92, it is determined that it is the timing of terminating the starter independent forced-driving, and the process advances to step S93, so that the starter independent forced-driving flag is set to zero in order to terminate the starter independent forced-driving. As the starter independent forced-driving flag is set to zero, the process waits in step S81 of the flowchart of FIG. 15 in the next time. Until the starter independent forced-driving flag is set to "1" in the next time, the starter independent forced-driving is not performed.

According to the sixth embodiment, in an engine starting device provided with a plurality of starting devices including a starter 27 capable of starting the engine 1 and a motor/generator 7 also capable of starting the engine 1, the starter 27 is driven only at an extremely low temperature (under a predetermined limited condition). In a case where the starter has a starter independent drive unit, the starter having the starter independent drive unit is forcedly driven at a noise blind timing. As a result, it is possible to prevent corrosion of the starter even when the starter having the starter independent drive unit is employed (refer to steps S71 and S72 of FIG. 14 and steps S81 and S82 of FIG. 15).

According to the sixth embodiment, the starter is forcedly driven by independently driving the starter (causing the starter to run idle). Therefore, there is no influence on control of the engine 1.

According to the sixth embodiment, the starter is forcedly driven at the noise blind timing. Therefore, a fact that the starter is operated is not recognized by a driver in a cabin.

Seventh Embodiment

Figure 17:
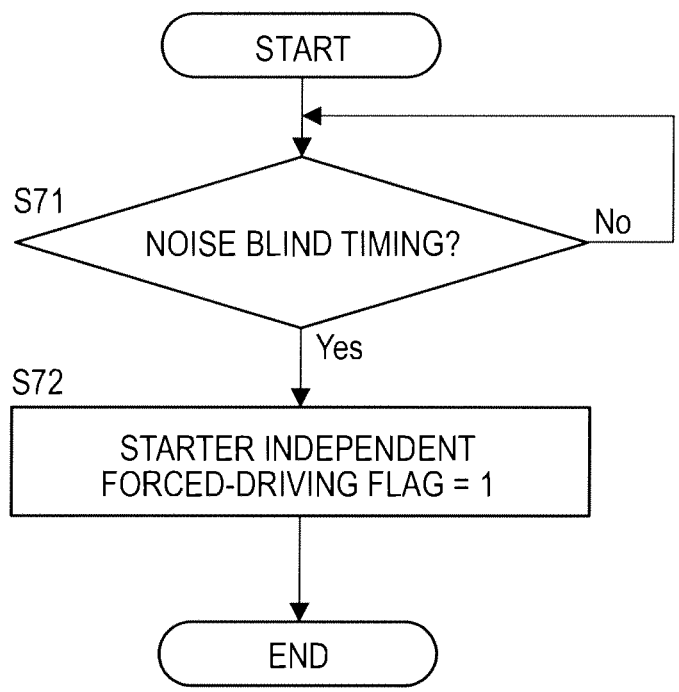
FIG. 17 is a flowchart illustrating setting of a starter independent forced-driving flag according to a seventh embodiment.
Figure 18:
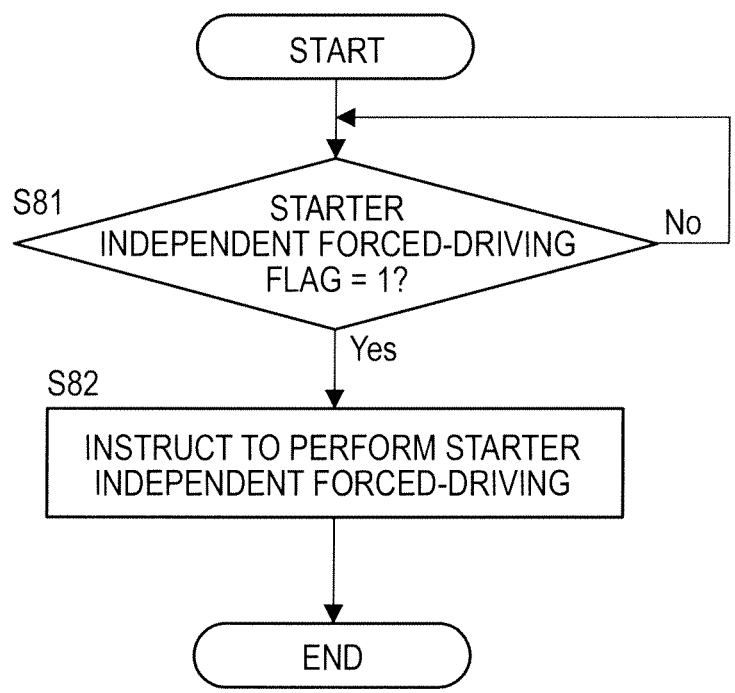
FIG. 18 is a flowchart illustrating an independent forced-driving operation of the starter according to the seventh embodiment.
Figure 19:
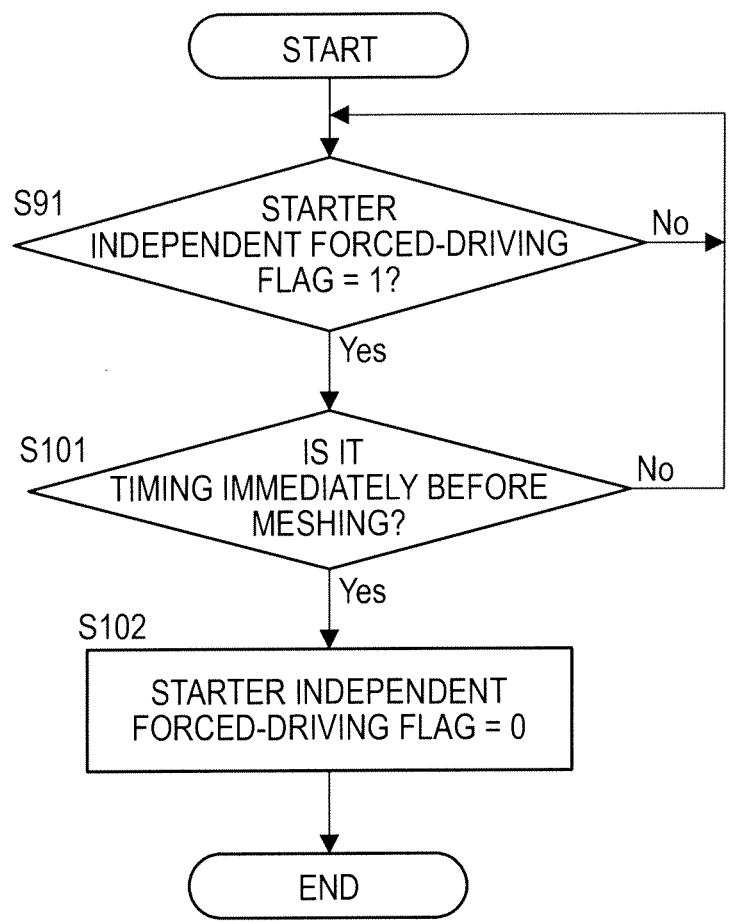
FIG. 19 is a flowchart illustrating an independent forced-driving post-processing of the starter according to the seventh embodiment.

FIGS. 17, 18, and 19 are flowcharts illustrating a process according to the seventh embodiment. FIGS. 17, 18, and 19 correspond to FIGS. 14, 15, and 16, respectively, of the sixth embodiment. Like reference numerals denote like elements as in FIGS. 14, 15, and 16 of the sixth embodiment.

According to the sixth embodiment, a starter having a starter independent drive unit is employed, and the starter is independently forcedly driven. Meanwhile, according to the seventh embodiment, a magnetic shift type starter 27 is employed, in which a pinion gear meshes with a ring gear as the motor (starter motor) is operated, and the starter 27 is independently forcedly driven. Therefore, the sixth embodiment is based on the configuration of FIGS. 1 and 2.

As recognized from comparison between FIGS. 14, 15, and 16 of the sixth embodiment and FIGS. 17, 18, and 19 of the seventh embodiment, the seventh embodiment is different from the sixth embodiment only in FIG. 19.

Referring to FIG. 19, in step S91, when the starter independent forced-driving flag is set to "1," the process advances to step S101, and it is determined whether or not it is a timing immediately before the pinion gear jumps into (jumpingly meshes with) the ring gear. The timing immediately before the pinion gear jumps into the ring gear is recognized in advance, for example, based on a voltage applied to the starter 27, an electric current flowing through the starter 27, a drive time of the starter 27, and the like identified from a specification of the starter 27. Therefore, the voltage, the electric current, and the driving time at the timing immediately before the pinion gear jumps into the ring gear are appropriately set in advance as a reference voltage, a reference current, and a reference driving time.

The voltage applied to the starter 27 may be detected using a voltage sensor, and the electric current flowing through the starter 27 may be detected using an electric current sensor. The driving time of the starter 27 is recognized by the engine controller 42. The engine controller 42 may determine that it is the timing immediately before the pinion gear jumps into the ring gear if the voltage, the current, and the driving time measured in practice match the reference voltage, the reference current, and the reference driving time, respectively. This information is transmitted to the integrated controller 44. If it is not the timing immediately before the pinion gear jumps into the ring gear, the process returns to step S91 and S101 and waits.

When the timing immediately before the pinion gear jumps into the ring gear is reached, it is determined that the timing for terminating the starter independent forced-driving is reached, and the process advances to step S102, so that the starter independent forced-driving flag is set to zero in order to terminate the starter independent forced-driving of the starter 27. If the starter independent forced-driving flag is set to zero, the process waits in step S81 of FIG. 18 in the next time, so that the starter independent forced-driving of the starter 27 is not performed until the starter independent forced-driving flag is set to "1" in the next time.

According to the seventh embodiment, in an engine starting device of an engine 1, provided with a plurality of starting devices including a starter 27 capable of starting the engine 1 and a motor/generator 7 also capable of starting the engine 1, the starter 27 is driven only at an extremely low temperature (under a predetermined limited condition). In a case where a magnetic shift type starter in which a pinion gear meshes with a ring gear is employed as the starter, the starter 27 is forcedly driven at a noise blind timing. As a result, it is possible to prevent corrosion of the starter 27 even when the magnetic shift type starter 27 is employed (refer to steps S71 and S72 of FIG. 17 and steps S81 and S82 of FIG. 18).

According to the seventh embodiment, the starter 27 is forcedly driven until the timing immediately before the pinion gear jumps into the ring gear (causing the starter 27 to run idle). Therefore, there is no influence on control of the engine 1.

According to the seventh embodiment, the starter 27 is forcedly driven at the noise blind timing. Therefore, a fact that the starter 27 is operated is not recognized by a driver in a cabin.

According to the seventh embodiment, the starter 27 is forcedly driven until the timing immediately before the pinion gear jumps into the ring gear. However, the invention is not limited thereto. Alternatively, the starter 27 may be forcedly driven such that the pinion gear does not jump into the ring gear.

Although description has been made by exemplifying a hybrid vehicle having a pair of starters (motor/generator 7 and starter 27), the invention is not limited thereto. For example, a vehicle having only an engine as a driving source may also have a pair of starters.

Figure 20:
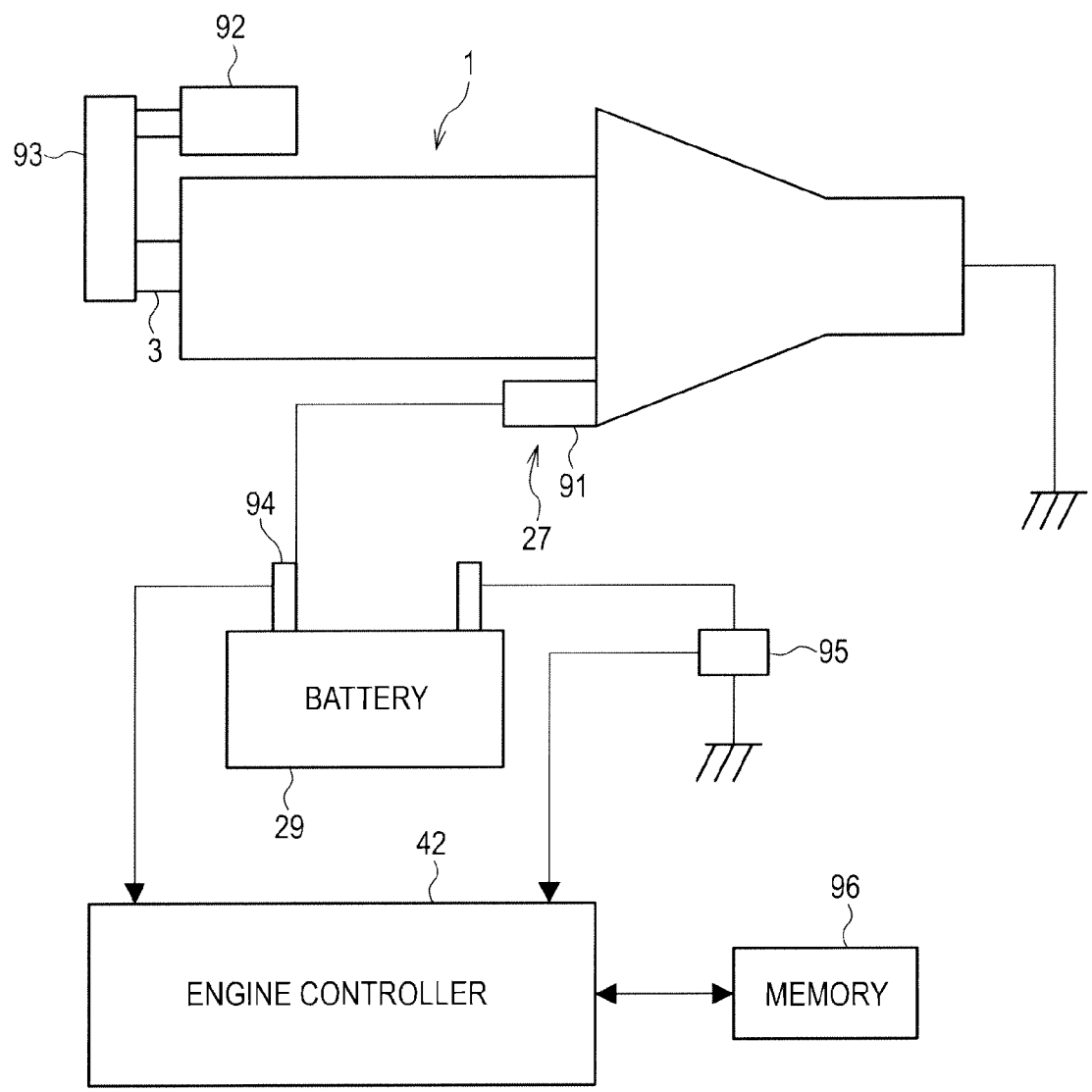
FIG. 20 is a schematic configuration diagram illustrating a vehicle in which only an engine is used as a driving source, and the protection device of the engine starting device is applied.

In this regard, description will be made for an idle stop control device having a pair of starters with reference to FIG. 20. In the starter 27 having a brush motor 91, a pinion gear (not illustrated) meshes with a ring gear (not illustrated) of an engine in response to an engine start manipulation from a driver, so that the power (rotation) is transmitted from the motor 91 to the crankshaft 3 to start the engine 1.

The motor/generator 92 is connected to the crankshaft 3 of the engine 1 using a belt 93. The motor/generator 92 serves as a generator when the engine 1 is used as a driving source. The motor/generator 92 also serves as a second starter that starts the engine 1 when the engine 1 is restarted after the automatic stop.

In this manner, the motor/generator 92 driven using a belt 93 is provided instead of an alternator of the related art due to the following reasons. That is, if an automatic stop/restart operation of the engine is repeated only using the starter 27 having the brush motor 91, the brush easily wears, so that the automatic stop/restart operation of the engine 1 using the starter 27 may fail. In this regard, a motor/generator 92 driven using a belt 93 is used as a second starter for the automatic stop/restart operation of the engine which is frequently generated. In this case, a brushless motor/generator is employed as the motor/generator 92.

The battery 29 supplies an electric current to the starter 27 and the motor/generator 92. The voltage sensor 94 detects a voltage of the battery 29 and outputs the detected value to the engine controller 42. The current sensor 95 detects a charge/discharge current of the battery 29 and outputs the detected value to the engine controller 42.

The invention may be applicable to an idle stop control device having a pair of starters 27 and 92 in a case where, in response to an engine start manipulation of a driver, the engine 1 starts using the starter 27 only at an extremely low temperature, and the engine 1 starts using the motor/generator 92 at a normal temperature.

This application claims priority based on JP2011-30466, filed with the Japan Patent Office on Feb. 16, 2011, the entire contents of which are incorporated into this specification by reference.

The invention claimed is:

1. A protection device of an engine starting device, the engine starting device being provided with a plurality of starting devices including a starter and a motor/generator, each of the starter and the motor/generator being configured to start the engine, the protection device protecting the starter, the engine being started by driving the motor/generator under a first condition, the engine being started by driving the starter under a second condition, a frequency of satisfaction of the second condition being less than that of the first condition, the second condition being a limited condition under which corrosion may occur in the starter in the event that the second condition has not been satisfied,
wherein the starter is forcedly driven when a predetermined condition is satisfied.

2. The protection device of an engine starting device according to claim 1, wherein the starter is forcedly driven when cranking is performed to start the engine.

3. The protection device of an engine starting device according to claim 1, wherein the starter is forcedly driven when cranking is performed to start the engine by driving the motor/generator.

4. The protection device of an engine starting device according to claim 2, wherein the starter is forcedly driven by causing the starter to run idle.

5. The protection device of an engine starting device according to claim 4, wherein the starter is forcedly driven at a noise blind timing.

6. The protection device of an engine starting device according to claim 1, wherein the predetermined condition includes at least one of:
a condition that a battery electrically connected to the motor generator is to be exchanged;
a condition that a hybrid vehicle on which the protection device is mounted travels by a predetermined distance;
a condition that a start operation of the engine is performed by a predetermined frequency; or
a condition that an operation time of the hybrid vehicle or an operation time of the engine elapses by a predetermined time.

7. The protection device of an engine starting device according to claim 1, wherein the predetermined condition includes at least one of:
a condition that an outdoor air temperature or a cooling water temperature is equal to or higher than a predetermined value;
a condition that a temperature of a battery is equal to or lower than a predetermined value; or
a condition that a voltage of the battery is equal to or lower than a predetermined value.

8. The protection device of an engine starting device according to claim 1, wherein the predetermined condition includes at least one of:
a condition of a start timing of the motor/generator;
a condition that it becomes a noise blind timing; or
a condition that it becomes a noise blind timing in a case where the starter is a magnetic shift type starter in which a pinion gear meshes with a ring gear.

* * * * *